United States Patent
Favart

(10) Patent No.: US 6,305,574 B1
(45) Date of Patent: Oct. 23, 2001

(54) DISPENSING DEVICE

(75) Inventor: Bernard Favart, Nimy (BE)

(73) Assignee: Dow Corning S.A., Seneffe (BE)

( * ) Notice: Subject to any disclaimer, the term of this patent is extended or adjusted under 35 U.S.C. 154(b) by 0 days.

(21) Appl. No.: 09/411,180

(22) Filed: Oct. 1, 1999

(30) Foreign Application Priority Data

Oct. 3, 1998 (GB) .................................................. 9821458

(51) Int. Cl.$^7$ .................................................... B67D 5/08
(52) U.S. Cl. ............................. 222/63; 222/444; 222/334
(58) Field of Search ............................. 222/63, 65, 64, 222/309, 444, 333, 334; 417/212

(56) References Cited

U.S. PATENT DOCUMENTS

| | | | |
|---|---|---|---|
| 3,207,384 | * 9/1965 | Wall | 222/318 |
| 3,738,775 | * 6/1973 | Strickland | 417/38 |
| 4,022,269 | * 5/1977 | Segawa | 164/314 |
| 4,159,784 | * 7/1979 | D'autry | 222/32 |
| 4,255,088 | * 3/1981 | Newton et al. | 417/1 |
| 4,425,986 | * 1/1984 | Wedlin | 184/3.2 |
| 4,545,504 | * 10/1985 | Fabel et al. | 222/55 |
| 4,547,134 | 10/1985 | Hirvonen | 417/349 |
| 4,826,050 | * 5/1989 | Murphy et al. | 222/175 |
| 4,830,230 | 5/1989 | Powers | 222/334 |

FOREIGN PATENT DOCUMENTS

| | | | |
|---|---|---|---|
| 2 231 624 | 11/1990 | (GB) | F04B/9/08 |
| 91/08445 | 6/1991 | (WO) | G01F/1/74 |
| 98/23932 | 6/1998 | (WO) | G01F/11/02 |

* cited by examiner

Primary Examiner—Kevin Shaver
Assistant Examiner—Frederick C Nicolas
(74) Attorney, Agent, or Firm—Jennifer S. Warren

(57) ABSTRACT

A dispensing device comprising a reservoir (2) and a one way valve (6) through which material may only be conducted into the reservoir (2). Reservoir (2) comprises a piston (16), a cylinder device (10) capable of permitting expansion of the capacity of the reservoir as material is conducted into the reservoir, an electrical switch means (18) adapted to detect and terminate the expansion of reservoir (2) at a predetermined capacity value, means for exerting pressure (10,16) on material within reservoir (2) when the expansion of reservoir (2) has been terminated and a one way valve (20) set to permit flow of material from reservoir (2) via an exit port whilst the pressure on the material in reservoir (20) is not less than a predetermined value.

7 Claims, 1 Drawing Sheet

DISPENSING DEVICE

FIELD OF THE INVENTION

This invention relates to dispensing devices and especially those employed for filling or dosing packages with fluids, for example sealant compositions.

BACKGROUND OF THE INVENTION

In one method of pigmenting or packaging sealants, an apparatus is used comprising at least one three-way valve to dose the pigment or the sealant or fungicide. Typically one may use in such apparatus a rotary valve set-up so as to allow the material to flow from a drum or buffer tank into a dosing cylinder. After rotation of the internal part of the valve, the material is pushed from the dosing cylinder to the package. Due to the continual rotation of the internal part of the valve and the high pressure used, rapid wear may occur, leading to leaks and frequent maintenance.

This invention provides a dispensing device which does not involve any rotating part.

SUMMARY OF THE INVENTION

The present invention is a dispensing device comprising a reservoir, a one way valve through which material may be conducted into the reservoir but through which the material may not be conducted out of the reservoir, a one way valve set to permit flow of material from the reservoir via an exit port while the pressure on the material in the reservoir is not less than a predetermined value, the reservoir comprising a piston and cylinder device capable of permitting expansion of the capacity of the reservoir as material is conducted into the reservoir, an electrical switch means adapted to detect and terminate the expansion of the reservoir at a predetermined capacity value, and a means for exerting pressure on material within the reservoir when the expansion of the reservoir has been terminated.

As will be apparent a dispensing device according to the present invention employs a system of differential pressure to open or close valves. In use, a dispensing device according to the invention can be expected to be more reliable than previously used devices and require much less maintenance.

Figure 1:
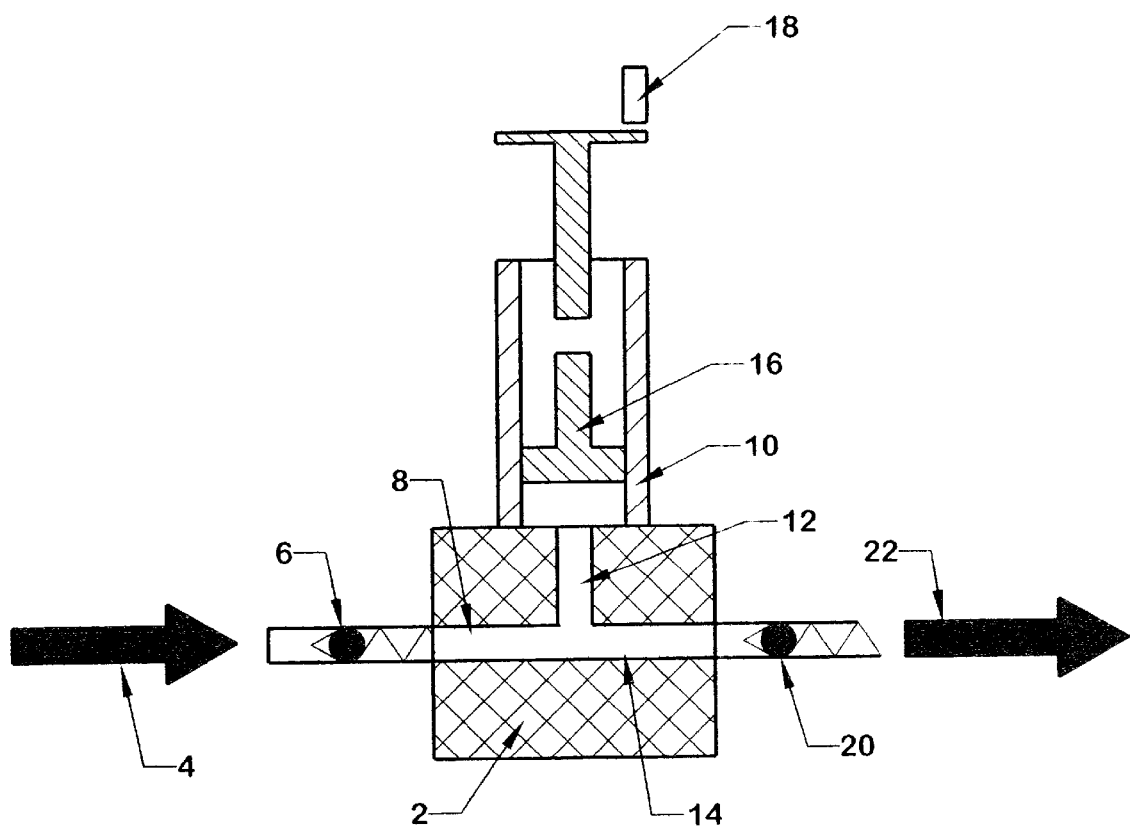
FIG. 1 is a schematic diagram of one embodiment of a dispensing device, illustrative of the present invention.

Explanation of the Reference Numbers
2 . . . reservoir block
4 . . . entering material stream
6 . . . entry port one-way valve
8 . . . bore
10 . . . cylinder
12 . . . bore
14 . . . reservoir
16 . . . piston
18 . . . switch
20 . . . exit port one-way valve
22 . . . exiting material stream

DETAILED DESCRIPTION OF THE INVENTION

In order that the invention may become more clear I have provided a description below, to be read with the accompanying drawing of a dispensing device provided by the invention and illustrative thereof.

The illustrative device is intended for use in filling or dosing packages with materials, for example filling curable sealant compositions into cartridges or drums, or inserting some pigment into a package of such a material. The following description is concerned with dispensing sealant composition into a cartridge but it will be apparent that many materials in fluid or fluidised form may be processed using the device.

The illustrative device comprises a reservoir block (2) into which a stream of material (4) may be conducted through a one way entry port valve (6) through which material may be conducted into a bore (8) within the reservoir block (2) filling the reservoir (14) but through which the material may not be conducted out of the reservoir. A cylinder (10) of a piston and cylinder device is mounted on the reservoir block and its interior communicates with the bore (8) via a bore (12); the bores (8) and (12) together with a volume within the cylinder (10) constitute a reservoir (14). A piston (16) of the piston and cylinder device is arranged in such a way that it may be moved outwardly of the reservoir block (2) in response to entry of material into the cylinder (10) and is thus capable of permitting expansion of the capacity of the reservoir as material is conducted into the bore (8) via the entry port valve (6). An abutment on a rod of the piston (16) is arranged to actuate a contact of electrical switch means (18) when the piston has been forced outwards from the reservoir block to a predetermined extent. The electrical switch means is so arranged that when it detects the movement of the piston to a predetermined position, the movement of the piston outwardly of the reservoir block (2) is checked, thus stopping expansion of the reservoir (14) and limiting the capacity of the dispensing device. Hydraulic or other means (not shown) are then actuated to cause the piston (16) to exert pressure on material within the reservoir (14), when the expansion of the reservoir has been terminated. Build up of pressure so caused ensures that the entry port valve (6) becomes closed to prevent further material arriving through the valve (6). An exit port one way valve (20) is set to allow material to pass from the reservoir (14) only when the material is under a pressure in excess of a predetermined value. This valve (20) then permits flow of material from the reservoir (14) as a stream (22) for so long as the pressure on the material in the reservoir (14) is not less than the predetermined value. When the material in the reservoir (14) is no longer under the pressure at the predetermined value, the valve (20) closes and the valve (6) reopens so as to allow the cycle to be repeated.

In use of the device under typical operating conditions, the sealant is urged by a pump or an hydraulic pail press from a drum or buffer tank to the valve (6) which is set to open at 5 bar pressure, the flow pressure typically being about 15 bar pressure. The exit valve (20) is typically set to open at a pressure of 45 bar, so it remains closed while the reservoir (14) is being filled. The filling is stopped automatically when the piston (10) hits the switch (18). Pressure is then applied on the piston (10) until internal pressure increases beyond 45 bar, pressure at which the exit valve opens. The entry valve remains closed as it cannot open in the direction of the pressure. Because the opening pressure for the valve (20) is greater than the maximum pressure that can be obtained on the entry side, there is no danger of leakage on the exit side while filling the cylinder to the pre-selected capacity.

That which is claimed is:
1. A dispensing device, for dispensing a material comprising a reservoir, having
    an entry port with a one way valve through which said material may only be conducted into the reservoir,
    an exit port comprising a one way valve set to permit flow of said material from the reservoir when said material in the reservoir has a pressure that is not less than a predetermined value,
a piston and cylinder device capable of permitting expansion of the reservoir as the material is conducted into the reservoir through said entry port,
an electrical switch means adapted to detect and terminate the expansion of the reservoir at a predetermined capacity value, and
a means for exerting pressure on said material within the reservoir when the expansion of the reservoir has reached said capacity value.

2. The dispensing device of claim 1 wherein the entry valve and the exit valve each has an opening pressure, and the opening pressure of the exit valve exceeds the opening pressure of the entry valve.

3. The dispensing device of claim 2 wherein the pressure generated by the pressure means exceeds the opening pressure of the exit valve.

4. The dispensing device of claim 1 further comprising a first bore through a reservoir block on a first axis and a second bore on a second axis and intersecting the first axis.

5. The dispensing device of claim 2 wherein the difference between the opening pressure of the entry valve and the opening pressure of the exit valve is about 40 bar.

6. The dispensing device of claim 4 where the entry valve and the exit valve are on the axis as the first bore, and the piston and cylinder device is on the same axis as the second bore.

7. The dispensing device of claim 6 where the first axis is perpendicular to the second axis.

* * * * *